US011878398B2

(12) United States Patent
Frenken

(10) Patent No.: US 11,878,398 B2
(45) Date of Patent: Jan. 23, 2024

(54) PRESSING TOOL

(71) Applicant: GUSTAV KLAUKE GMBH, Remscheid (DE)

(72) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 500 days.

(21) Appl. No.: 17/274,511

(22) PCT Filed: Sep. 6, 2019

(86) PCT No.: PCT/EP2019/073876
§ 371 (c)(1),
(2) Date: Mar. 9, 2021

(87) PCT Pub. No.: WO2020/053101
PCT Pub. Date: Mar. 19, 2020

(65) Prior Publication Data

US 2021/0339367 A1 Nov. 4, 2021

(30) Foreign Application Priority Data

Sep. 10, 2018 (DE) ..................... 10 2018 121 971.7

(51) Int. Cl.
*B25B 5/00* (2006.01)
*B25B 27/02* (2006.01)
(Continued)

(52) U.S. Cl.
CPC ....... *B25B 27/026* (2013.01); *H01R 43/0427* (2013.01); *H01R 43/058* (2013.01)

(58) Field of Classification Search
CPC .... B25B 5/00; B25B 5/02; B25B 5/04; B25B 5/061; B25B 27/146; B25B 27/00; B25D 2250/11; B25D 2250/00; B21D 39/048
See application file for complete search history.

(56) References Cited

U.S. PATENT DOCUMENTS 4,041,766 A 8/1977 Johnson et al.
6,990,843 B2 1/2006 Frenken
(Continued)

FOREIGN PATENT DOCUMENTS

DE 10318508 A1 8/2004
DE 102013100183 A1 7/2014
(Continued)

OTHER PUBLICATIONS

International Search Report for International Patent Application No. PCT/EP2019/073876 dated Jan. 2, 2020, 5 pages.
Machine Translation for DE10318508.

*Primary Examiner* — Lee D Wilson
(74) *Attorney, Agent, or Firm* — Klintworth & Rozenblat IP LLP

(57) ABSTRACT

A pressing tool performs a pressing operation for the press fitting of parts. One part can have different outer dimensions within a specified range. A tool part acts on the part, is a part of a pivoting jaw which has an action surface, and can be pivoted about a pivot axis from a starting position having a greatest opening width to a pressing position having a smaller opening width. A hydraulic piston movable in a hydraulic cylinder applies a piston force, depending on a hydraulic pressure in the hydraulic cylinder. A higher pressing force is in effect when a greater opening width of the pivoting jaw is provided and when the maximum piston force is reached. When any opening width that is smaller than the greater opening width is provided, a pressing force lower than the higher pressing force is in effect when the maximum piston force is reached.

20 Claims, 15 Drawing Sheets

(51) Int. Cl.
*H01R 43/042* (2006.01)
*H01R 43/058* (2006.01)

(56) References Cited

U.S. PATENT DOCUMENTS

| | | | | |
|---|---|---|---|---|
| 7,254,982 | B2 | 8/2007 | Frenken | |
| 7,614,139 | B2 * | 11/2009 | Itrich | H01R 4/5083 29/761 |
| 9,993,885 | B2 | 6/2018 | Frenken | |
| 10,109,971 | B2 * | 10/2018 | Lefavour | B25B 27/146 |
| 10,468,847 | B2 | 11/2019 | Frenken | |
| 10,987,794 | B2 * | 4/2021 | Frenken | B25F 5/00 |
| 11,426,850 | B2 * | 8/2022 | Lefavour | B25B 27/146 |
| D972,388 | S * | 12/2022 | Hyde | D8/70 |
| 2008/0282763 | A1 * | 11/2008 | Chiasson | B25F 5/02 72/453.16 |
| 2015/0364889 | A1 * | 12/2015 | Frenken | H01R 43/0427 29/862 |
| 2016/0363510 | A1 * | 12/2016 | Kanack | B25B 23/1456 |
| 2020/0282481 | A1 * | 9/2020 | Lehr | B23D 35/001 |
| 2021/0339367 | A1 * | 11/2021 | Frenken | H01R 43/0427 |

FOREIGN PATENT DOCUMENTS

| | | | |
|---|---|---|---|
| WO | 99/019987 | A1 | 4/1999 |
| WO | 02/054542 | A1 | 7/2002 |
| WO | 2003/084719 | A2 | 10/2003 |
| WO | 2014/009363 | A1 | 1/2014 |
| WO | 2014/0108361 | A1 | 7/2014 |
| WO | 2003/0022480 | A1 | 3/2020 |

* cited by examiner

PRESSING TOOL

AREA OF TECHNOLOGY

The invention relates to a pressing tool for performing a pressing operation for the press-fitting of parts, for example a sleeve to an electrical conductor, wherein one part, for example the sleeve, can have different outer dimensions within a specified range, wherein the pressing tool further has a tool part for acting on the part, for example the sleeve, and the tool part is part of a pivoting jaw, wherein the pivoting jaw further has an action surface and can be pivoted around a pivot axis from a starting position having a greatest opening width into a pressing position having a smaller opening width, wherein the pressing tool further has a hydraulic piston movable in a hydraulic cylinder, which applies a piston force depending on a hydraulic pressure in the hydraulic cylinder, wherein each time the hydraulic piston is moved, the pressing operation automatically ends once a same maximum piston force has been reached, wherein the hydraulic piston further has an interactive surface formed by a roller connected with the hydraulic piston for a force-transmitting interaction of the hydraulic piston with the action surface, wherein the piston force can be converted into a deviating pressing force due to a geometry of the action surface.

PRIOR ART

Known pressing tools are preferably used for pressing, especially also for pressing referred to as “crimping”, parts, for example a sleeve, further for example a cable lug with inserted electrical conductor. Such parts, for example sleeves or cable lugs, are present within a defined range in different outer dimensions, in particular with different cross sectional surfaces, in particular with a receiving opening for receiving an additional part, for example the conductor(s). For example, sleeves or cable lugs with 4, 10, 16, 50, 70 or even 120 $mm^2$ are known in this regard.

There is a need to be able to press such parts, for example sleeves or cable lugs, with different outer dimensions preferably without tool replacement, further preferably without additional settings on the pressing tool, with only one—the same—pressing tool. For example, such a pressing tool is known from WO 2014/108361 A1 (US 2015/0364889 A1). This pressing tool can be electrohydraulically actuated, and correspondingly has a piston and a hydraulic cylinder, wherein a piston rod carrying the tool part is linearly moved via the piston. The part or a pellet, for example the sleeve or cable lug, is pressed with the part or the part received therein in a receiving opening, for example a conductor, between the tool part and a fixed jaw.

Known from DE 103 18 508 A1 is a pressing tool with two pivoting jaws in the exemplary embodiment, wherein only a single one can also be provided, wherein the pivoting jaw can be pivoted around a pivot axis aligned transverse to a piston displacement direction. The pivoting jaw can be designed to carry a tool part, for example to perform a pressing operation. For example, such a pressing tool is further known from WO 03/022480 A1.

As also known, each time the piston moves, the pressing operation automatically ends once a same maximum piston force has been reached. As known, this can result from a valve automatically opening once the maximum pressure has been reached, after which an automatic return displacement of the piston and tool part controlled by the latter can be introduced according to another known configuration.

For example, reference is made to WO 99/19987 A1 (U.S. Pat. No. 6,276,186 B1) in this conjunction.

SUMMARY OF THE INVENTION

Proceeding from the prior art described above, the object of the invention is to indicate a pressing tool that is advantageously designed with respect to performing a pressing operation of parts with different outer dimensions within a defined range.

In a first inventive idea, a possible solution to the object is provided by a pressing tool for which emphasis is placed on designing the action surface in such a way that a higher pressing force is active as allocated to a larger opening width of the pivoting jaw once the maximum piston force has been reached, and that a smaller pressing force by comparison to the higher pressing force is active as allocated to each smaller opening width of the pivoting jaw by comparison to the larger opening width once the maximum piston force has been reached.

As a result of the inventive solution, the maximum piston force that when reached causes the pressing operation to automatically end is reached in preferably each (proper) pressing operation, if the respectively necessary pressing force has been reached independently of the size of the part to be crimped or pressed, here for example the sleeve or cable lug. The effective pressing force at an opening width of the pivoting jaw that is less than the opening width as allocated to the highest pressing force is correspondingly always smaller than the greatest pressing force. As a consequence, the same pivoting jaw can be used to press different sized parts, such as sleeves or cable lugs, with parts preferably arranged herein, for example electric conductors. Accordingly, different pressing forces can be applied to perform the press-fitting without changing the pressing tool.

The pressing force as allocated to an opening width of the pivoting jaw can be easily adjusted by giving the action surface of the pivoting jaw a corresponding geometric design. For example, the mentioned WO 03/022480 A1 describes the relevant correlations for the above.

The different pressing force is thus achieved due to a corresponding design of the action surface, via which the piston acts on the pivoting jaw, preferably using a roller connected with the piston. With regard to a layout in which the rotational axis of the roller acting on the action surface is represented as a point, the action surface can in this way form a curved path, which given a linear movement of the piston and the roller connected therewith produces a degressive force transmission to the pivoting jaw, and via the latter to the tool part.

The pressing force that can be exerted at a given opening width of the pivoting jaw depends directly on the outer dimensions of the part to be pressed, for example the sleeve or cable lug.

Additional features of the invention, including in the description to the figures, are often explained below in their preferred allocation to the subject matter of claim 1 or to features in additional claims. However, they can also be important as allocated to only individual features of claim 1 or the respective additional claim, or each independently.

The tool part can be designed as a mandrel directed tangentially relative to a pivot circle, through whose midpoint the pivot axis runs. Such a mandrel is correspondingly pivotable, and can interact like a stamp with the part to be pressed. A fixed jaw can here serve as the counter-jaw, and thus cannot be pivotably mounted.

The mandrel is here preferably designed in such a way that it can be used to suitably press parts, in particular sleeves or cable lugs, with different outer dimensions in regard to the arising different pressing force. In a cross section in which the pivot circle is represented by a line, for example, the mandrel can have a pointed conical geometry, with a cone tip directed in the pressing direction.

In another embodiment, the mandrel can be designed as a stepped mandrel, and in this way can have a stepped outer contour that expands radially outward—relative to the pivot circle—corresponding to the aforementioned cross section, proceeding from the cone tip of a stepped cone.

In one possible embodiment with reference to a layout in which the pivot circle is represented as a point at least in the projected layout surface of the mandrel, the mandrel can further be circular in shape, or alternatively polygonal, for example square, hexagonal or octagonal.

In another embodiment, two pivoting jaws can be provided. These two pivoting jaws can be arranged so as to be rotatable around a shared pivot axis, and here further preferably be uniformly movable toward each other during the pressing operation.

As also preferred, each pivoting jaw can have an action surface via which the piston uses a respective roller with an interactive surface to exert a pivoting action on the pivoting jaws.

In a preferred embodiment, only one pivoting jaw in an arrangement comprised of two pivoting jaws can carry the tool part, while the other pivoting jaw has a receptacle, for example one shaped like shell, for inserting the part to be pressed, and thereby forms a counter-bracket with respect to the pivoting jaw provided with the tool part. As preferred, the receptacle of the one pivoting jaw can here be suitable for receiving parts with different outer dimensions within a defined range.

Each pivoting jaw can also have a tool part. In such an embodiment, both tool parts can be moved toward each other along the pivot circle during the pressing operation, with the part to be pressed interspersed. As also generally possible, the tool part can here be an integral component of the pivoting jaw, but alternatively also a part that can be allocated to the pivoting jaw and fastened thereto, for example a replacement part.

A tool part, in particular each of the tool parts when a tool part is arranged on each pivoting jaw, can have a plurality of ribs arranged one after the other in the direction of the pivot axis. These ribs can be spaced apart from each other in the direction of the pivot axis. Open spaces can here arise between two ribs, into which the ribs of the other tool part can enter during a pressing operation. This correspondingly yields a tool part pairing, the ribs of which can comb into each other during the pressing operation.

This can initially produce a favorable guiding of the tool parts along each other during the pressing operation. As further also preferred, the ribs can further be directly used for pressing the part, for example the sleeve or cable lug, further in particular their peripheral edges of the ribs facing in the pivoting direction during the pressing operation. This yields a corresponding pressing geometry for the part to be pressed.

The ribs of a tool part can be divided into first and second ribs, which are staggered relative to each other in the direction of the pivot axis. The first and second ribs can have different shapes, in particular relative to the front peripheral edge facing in the pivoting direction during the pressing operation. These first and second ribs can also be designed essentially mirror-symmetrically to the pivot circle or to a tangential to the pivot circle.

In a preferred embodiment, the first and second ribs alternate regularly one after the other in the direction of the pivot axis.

In relation to a press opening that remains between the tool parts and has an essentially rectangular appearance in the direction of the pivot axis, the first ribs can form a first, essentially straight peripheral edge of the press opening, and the second ribs can form a second peripheral edge running essentially perpendicular to the first peripheral edge. With respect to a projection along the pivot axis in a plane provided transverse to the pivot axis, the progression of the first and second peripheral edges of the two tool parts thereby yields a press opening with a rectangular appearance, possibly with equally long peripheral edges in the area of the press opening, with the peripheral edge length depending on the outer dimensions of the pressed part.

As also preferred, the first and second peripheral edges can each extend at an acute angle to the pivot circle or a tangent of the pivot circle, so that the press opening has an essentially diamond-shaped appearance.

In a possible embodiment, both tool parts have an identical design, in particular with respect to the formation and number of first and second ribs.

The tool part can also be movably secured to the pivoting jaw. This movability can be limited to a pivotability, with a pivot axis that runs parallel to the pivot axis of the pivoting jaw. Alternatively or additionally to being pivotable, the tool part can further also be given the ability to rotate around a rotational axis that runs perpendicular to the alignment of the pivot axis.

Given the arrangement of two tool parts, both tool parts can also be movably, in particular pivotably, arranged, or alternatively only one of the tool parts.

With respect to the disclosure, the ranges or value ranges or multiple ranges indicated above and below also include all intermediate values, in particular in 1/10 increments of the respective dimension, possibly even dimensionless. For example, the indication 28 to 35 kN also includes the disclosure of 28.1 to 35 kN, 28 to 34.9 kN, 28.1 to 34.9 kN, etc., the disclosure of 8 to 12 mm also includes the disclosure of 8.1 to 12 mm, 8 to 11.9 mm, 8.1 to 11.9 mm, etc. On the one hand, this disclosure can be used to restrict a specified range limit from below and/or above, or alternatively or additionally to disclose one or several singular values out of the respectively indicated range.

BRIEF DESCRIPTION OF THE INVENTION

The invention is described below based on the attached drawing; however, the latter only shows exemplary embodiments. Therefore, a part that is described only as relates to one of the exemplary embodiments and not replaced by a different part in another exemplary embodiment based upon the feature highlighted therein is also described as a part that might at least possibly be present for this other exemplary embodiment as well. The drawing shows:

FIG. 1 a perspective view of a pressing tool, relating to a first embodiment, here essentially having a drive unit part and a working head with pivoting jaw;

Figure 2:
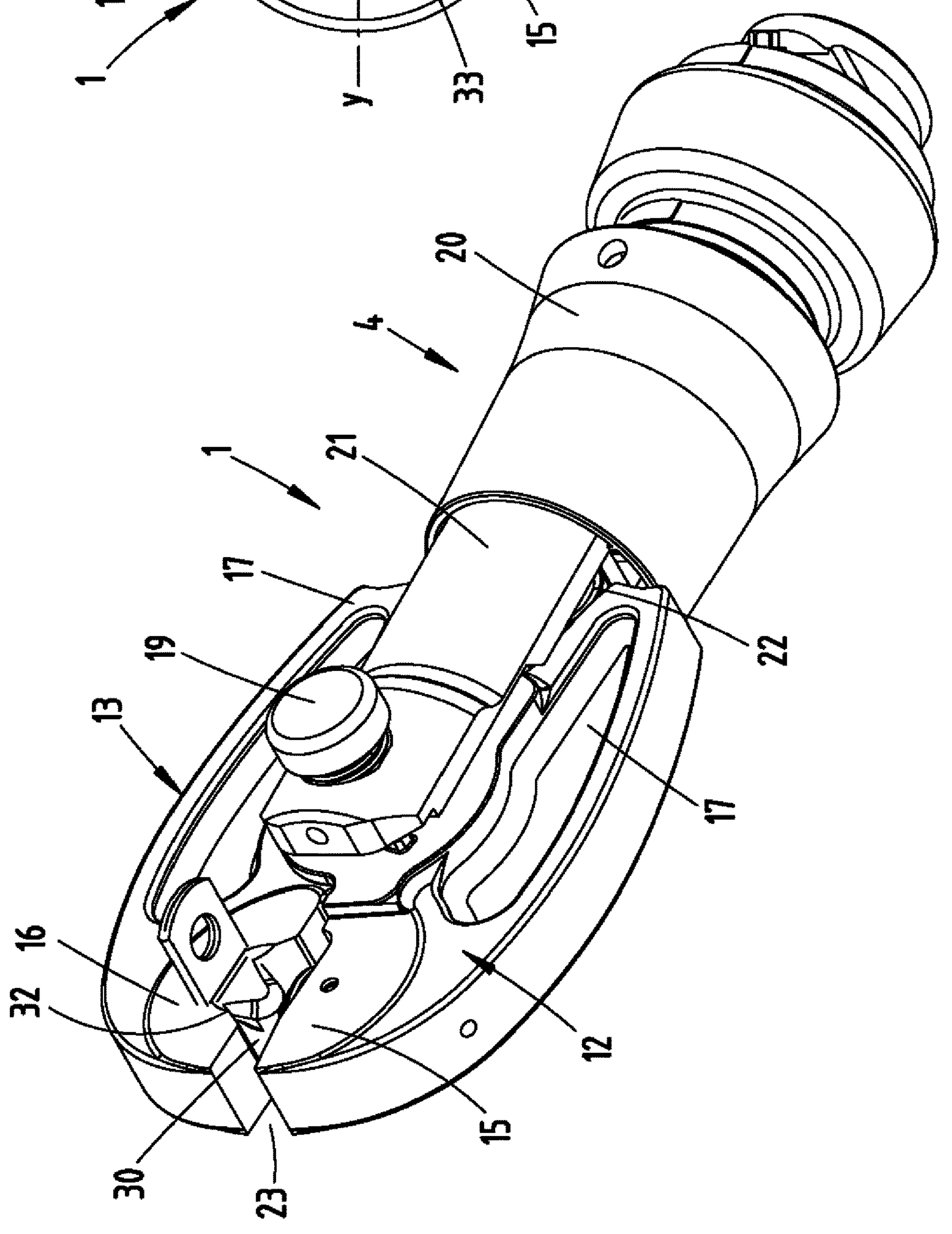
FIG. 2 is an individual view of the working head according to FIG. 1.
Figure 4:
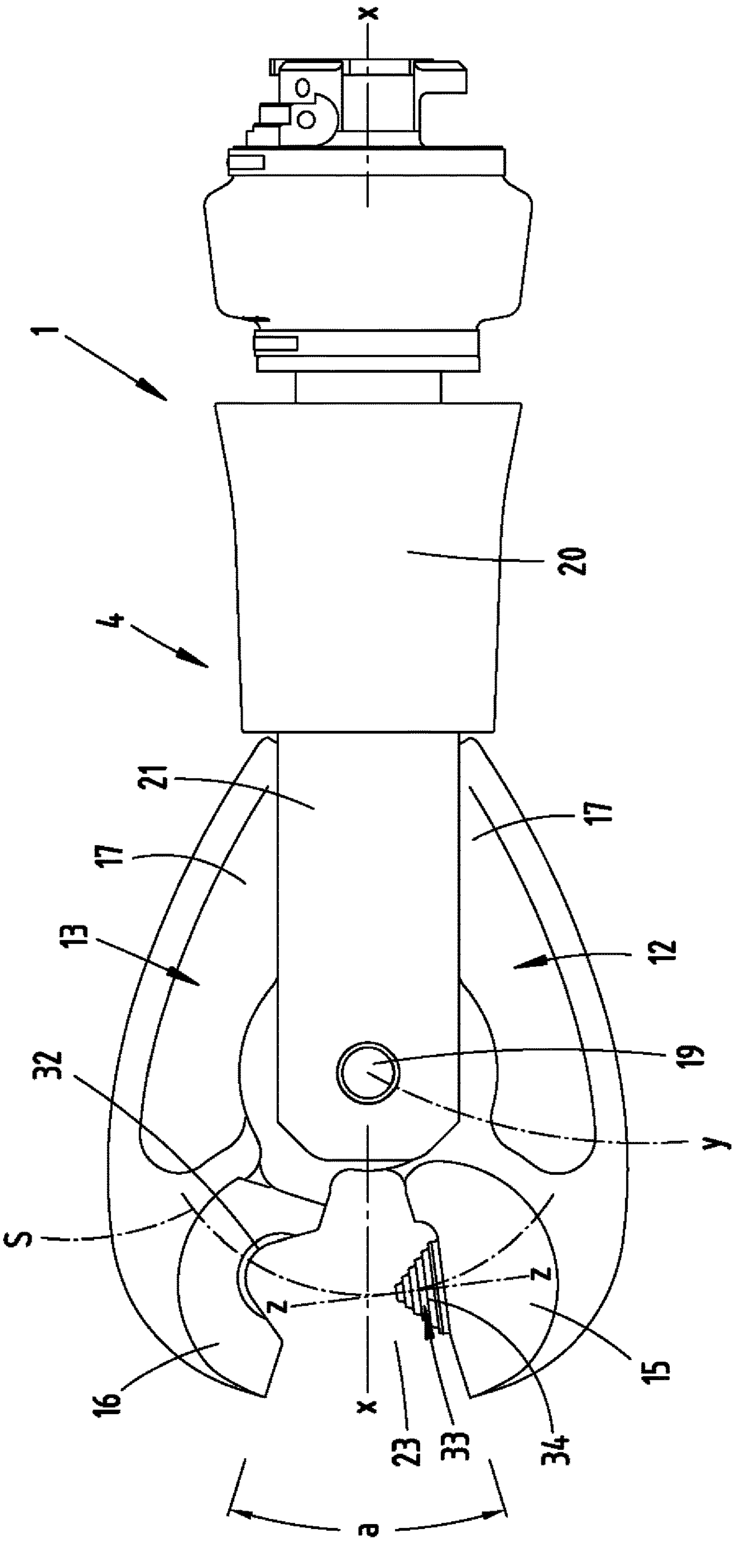
FIG. 4 is the side view against the working head, relating to a basic position of the tool with a greatest opening width between the pivoting jaws.
Figure 7:
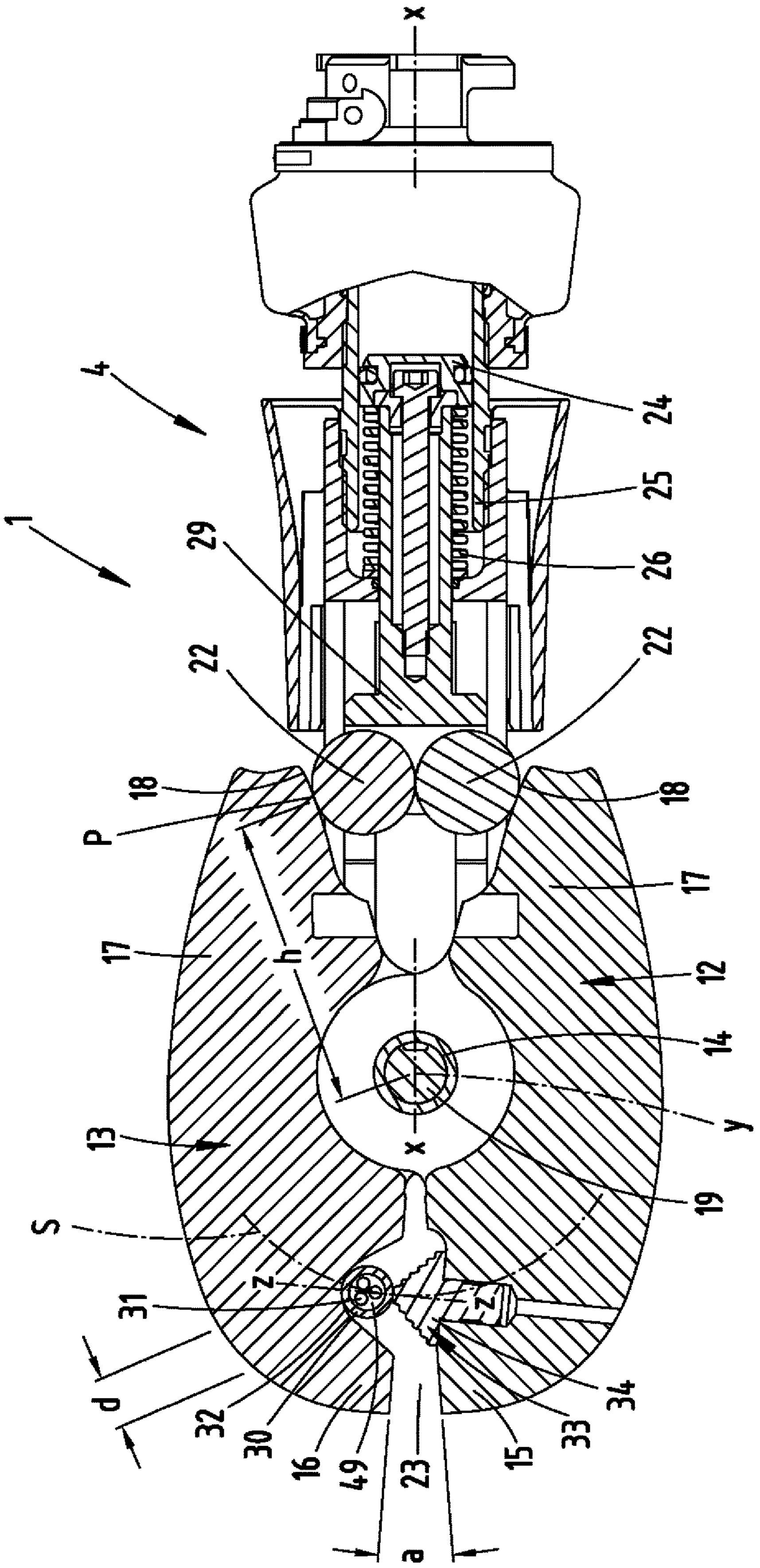
Figure 8:
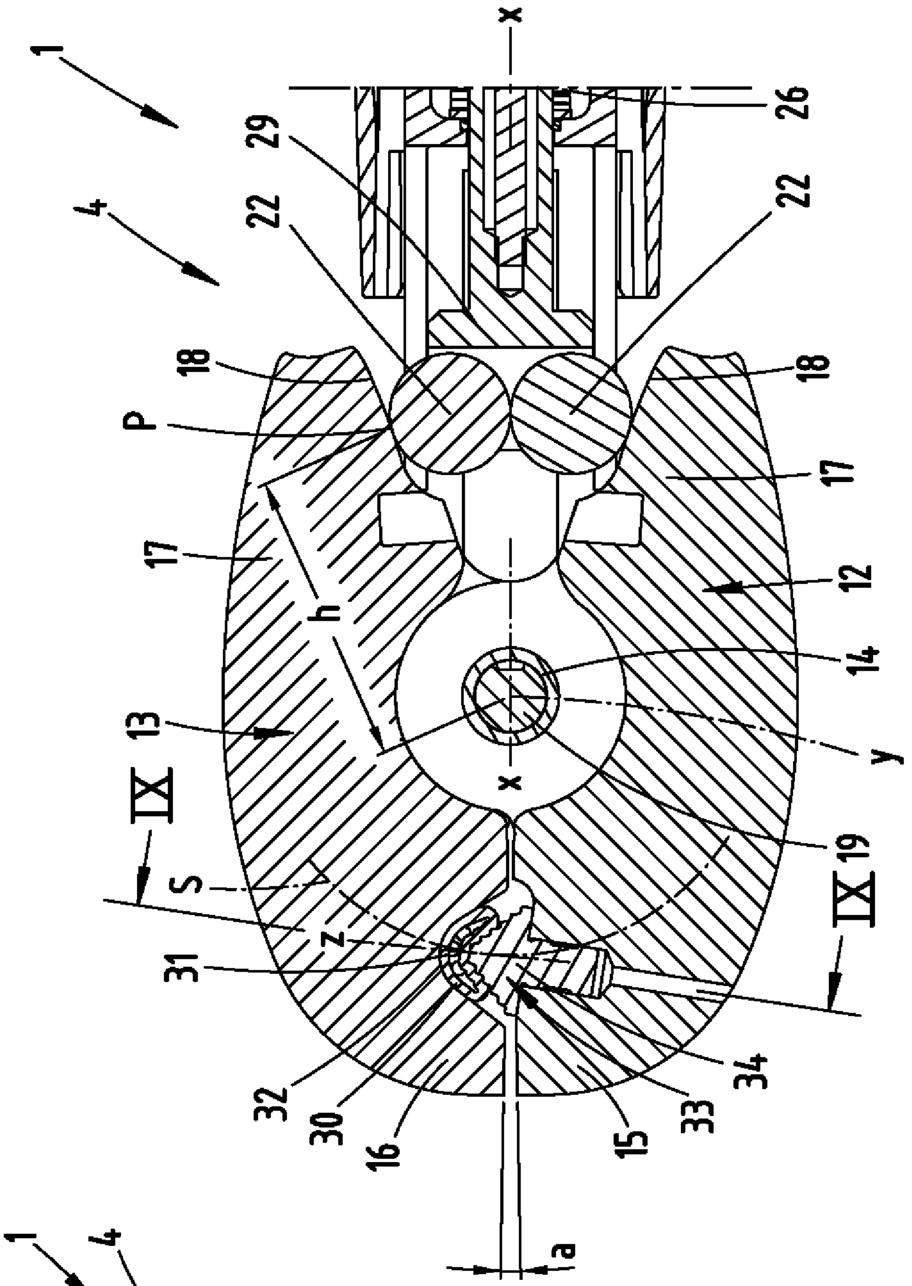
Figure 9:
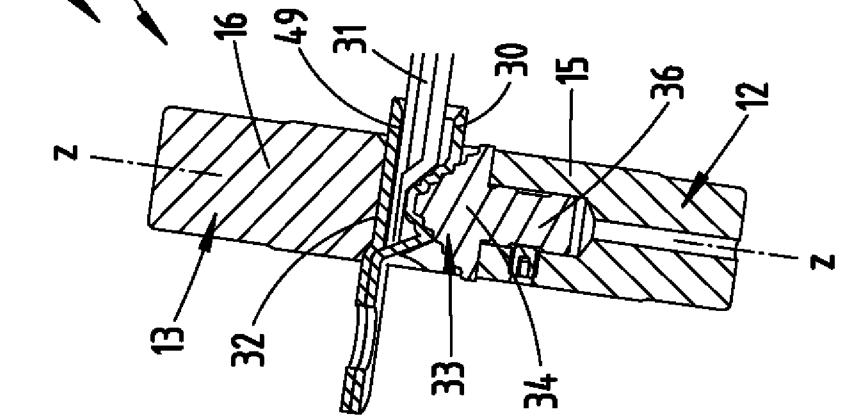
Figure 10:
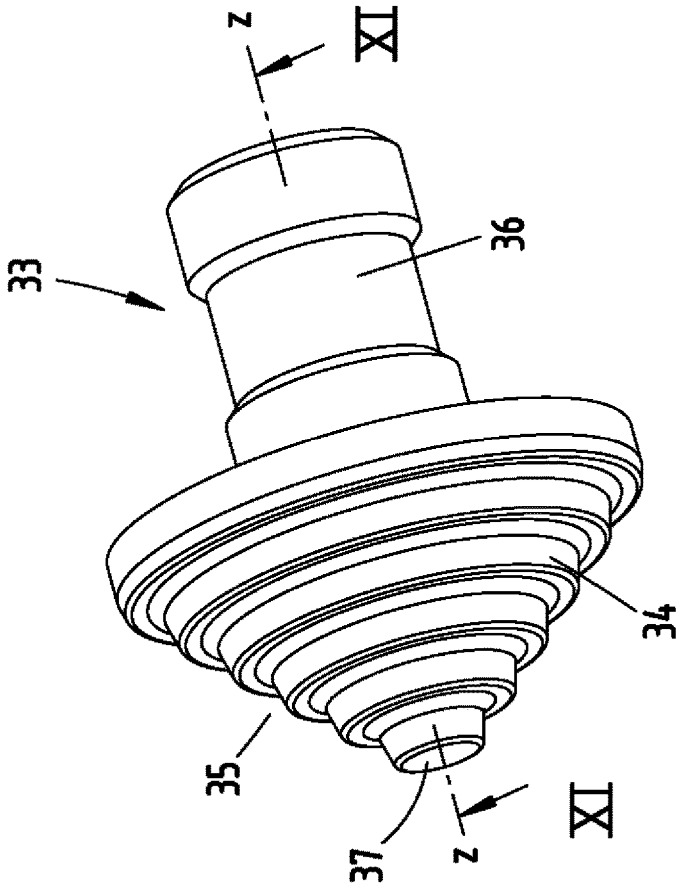
Figure 11:
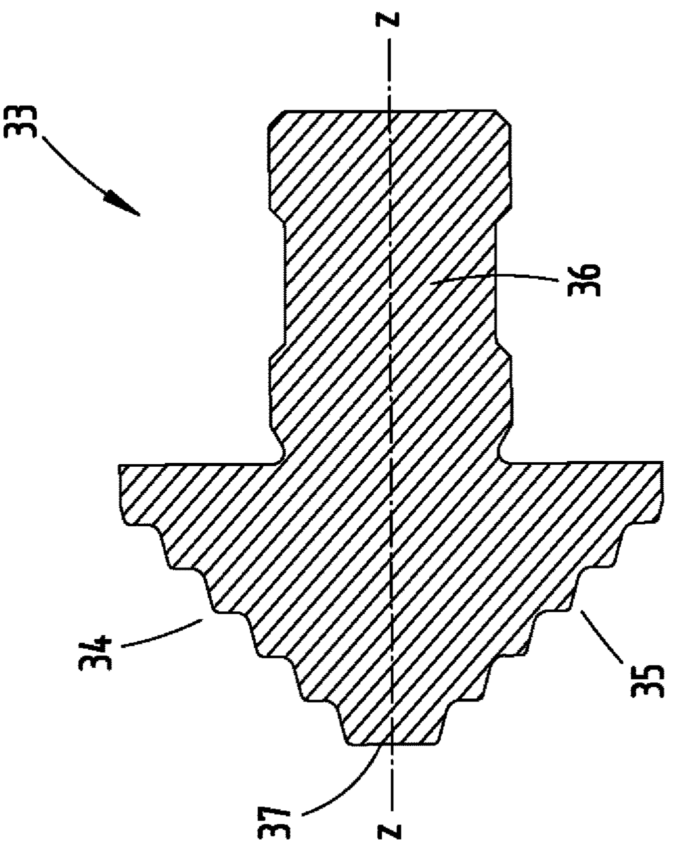
Figure 12:
Figure 14:
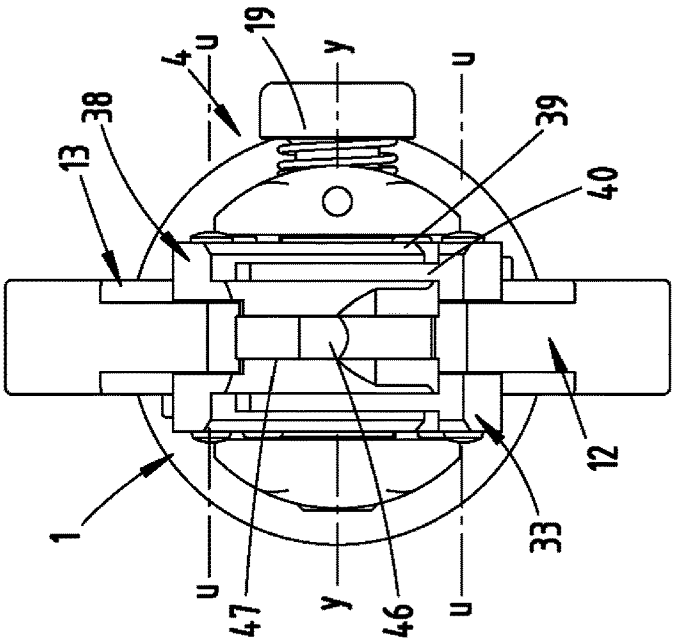
Figure 13:
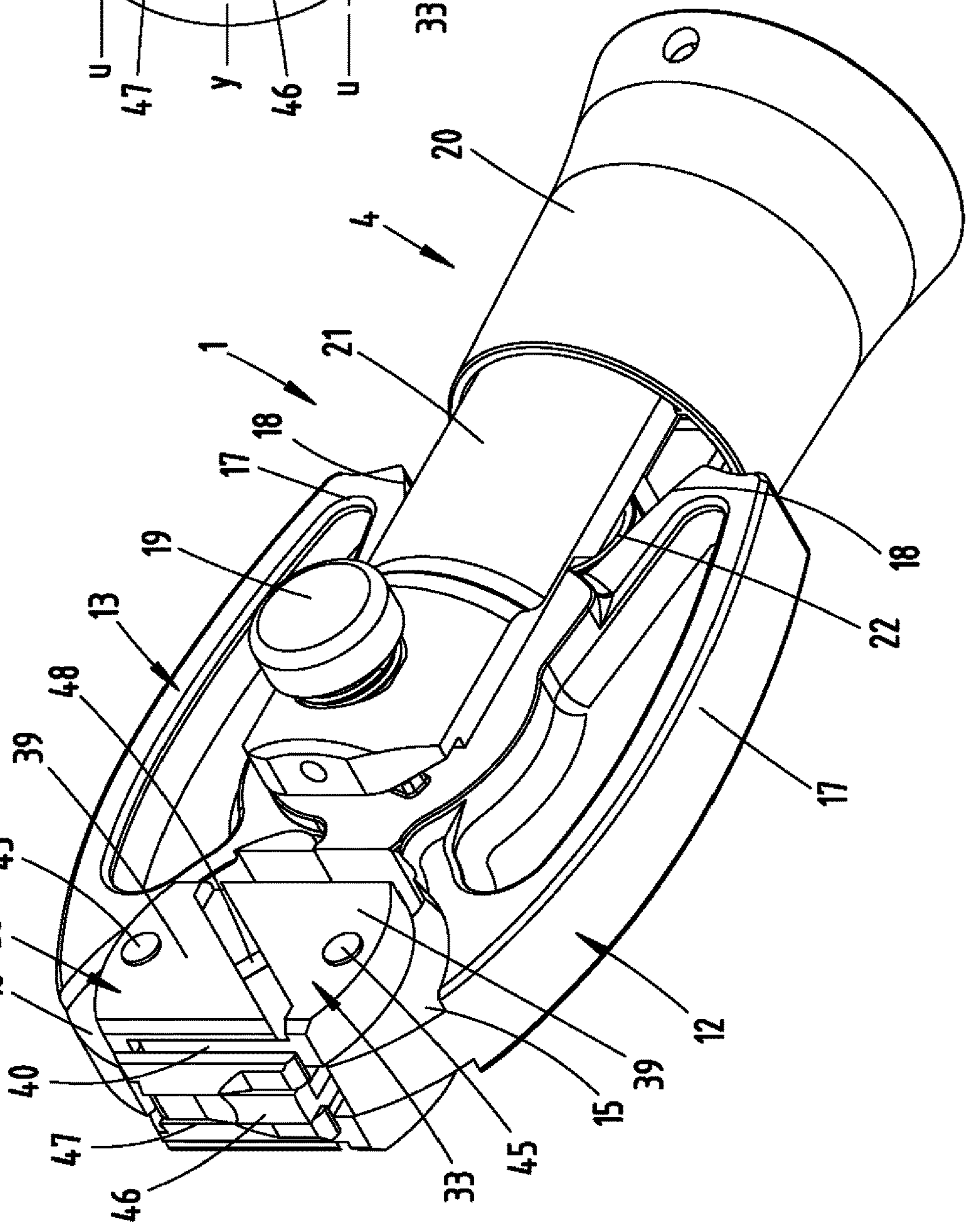
Figure 15:
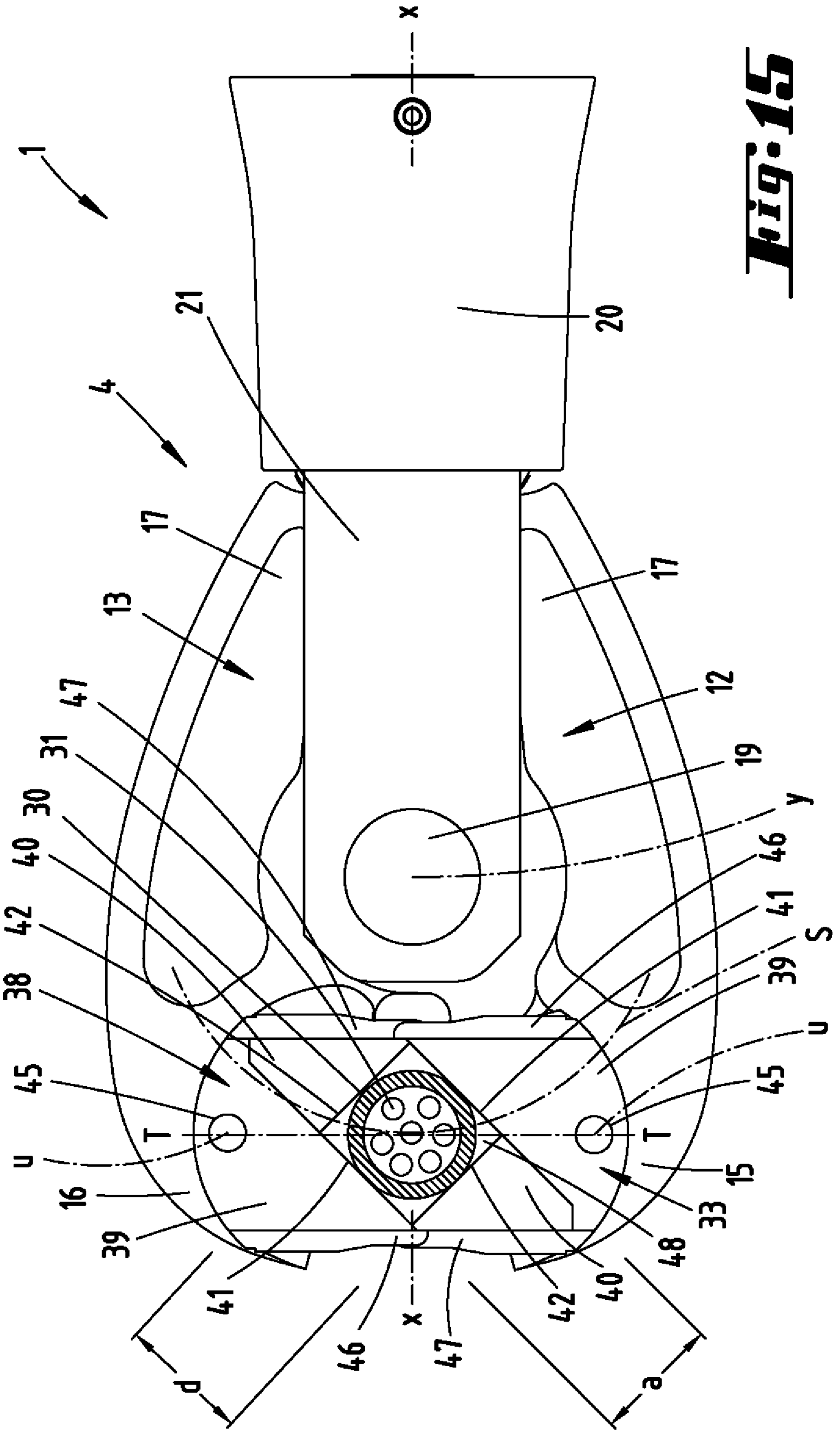
Figure 16:
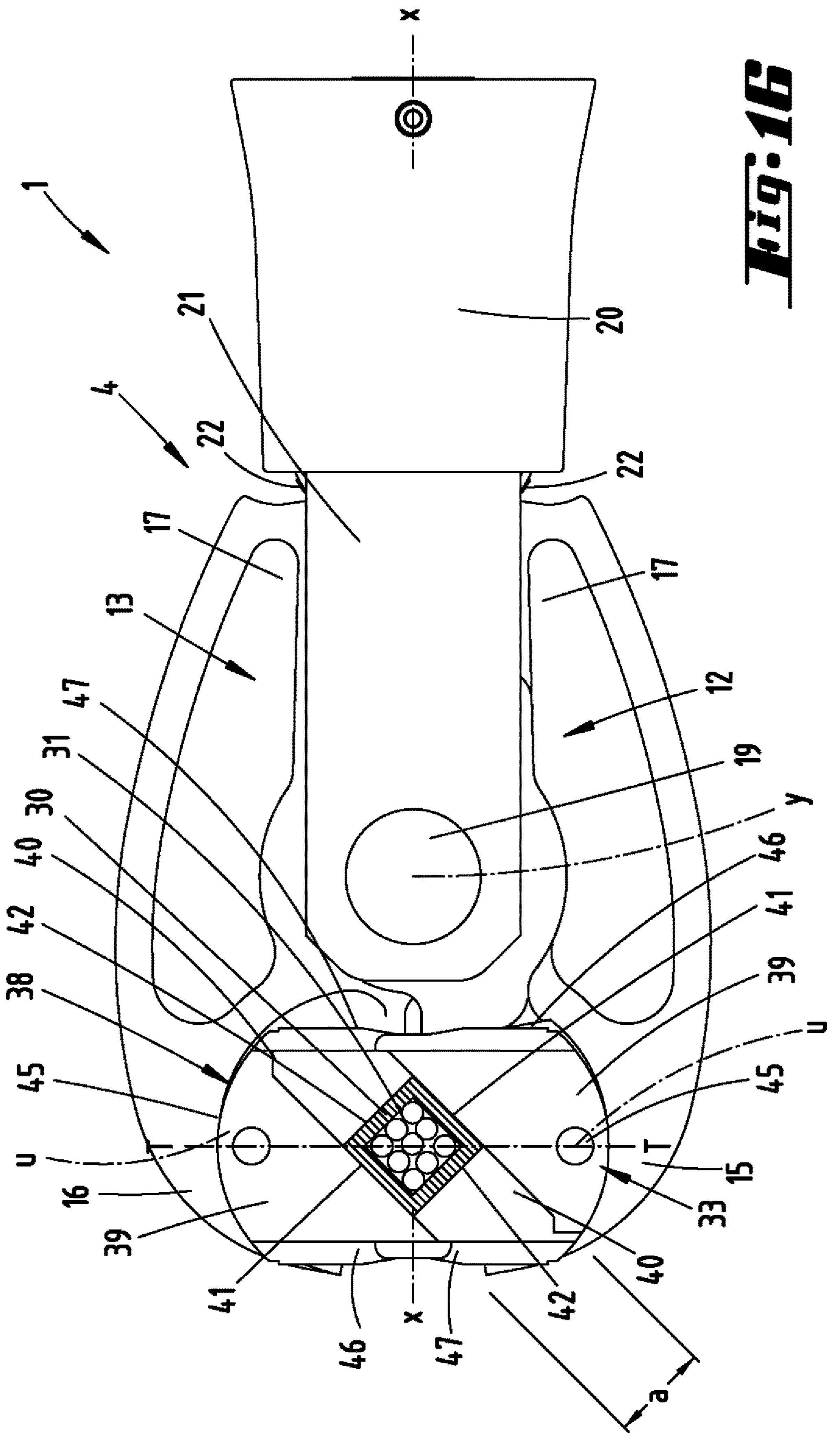
Figure 17:
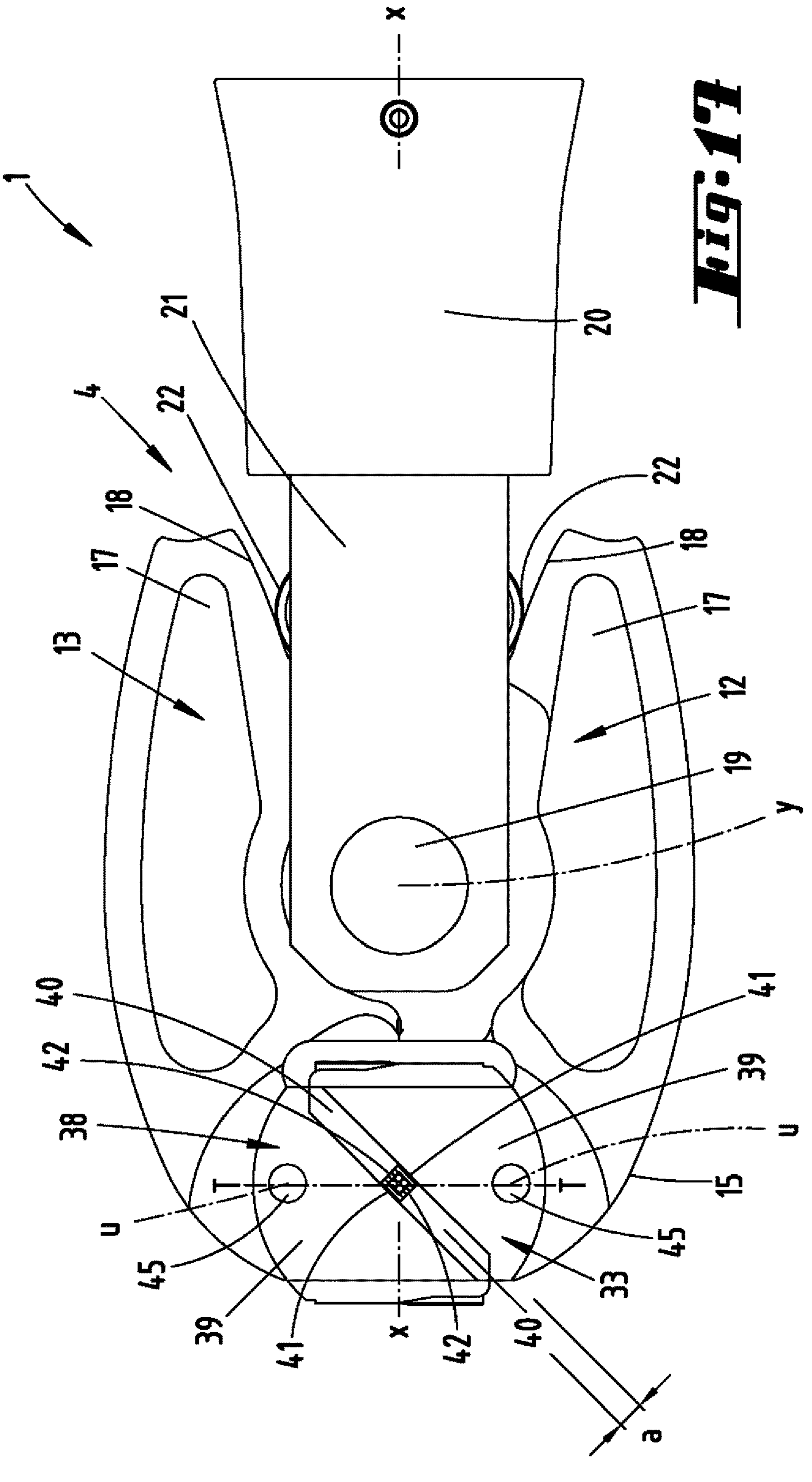
Figure 18:
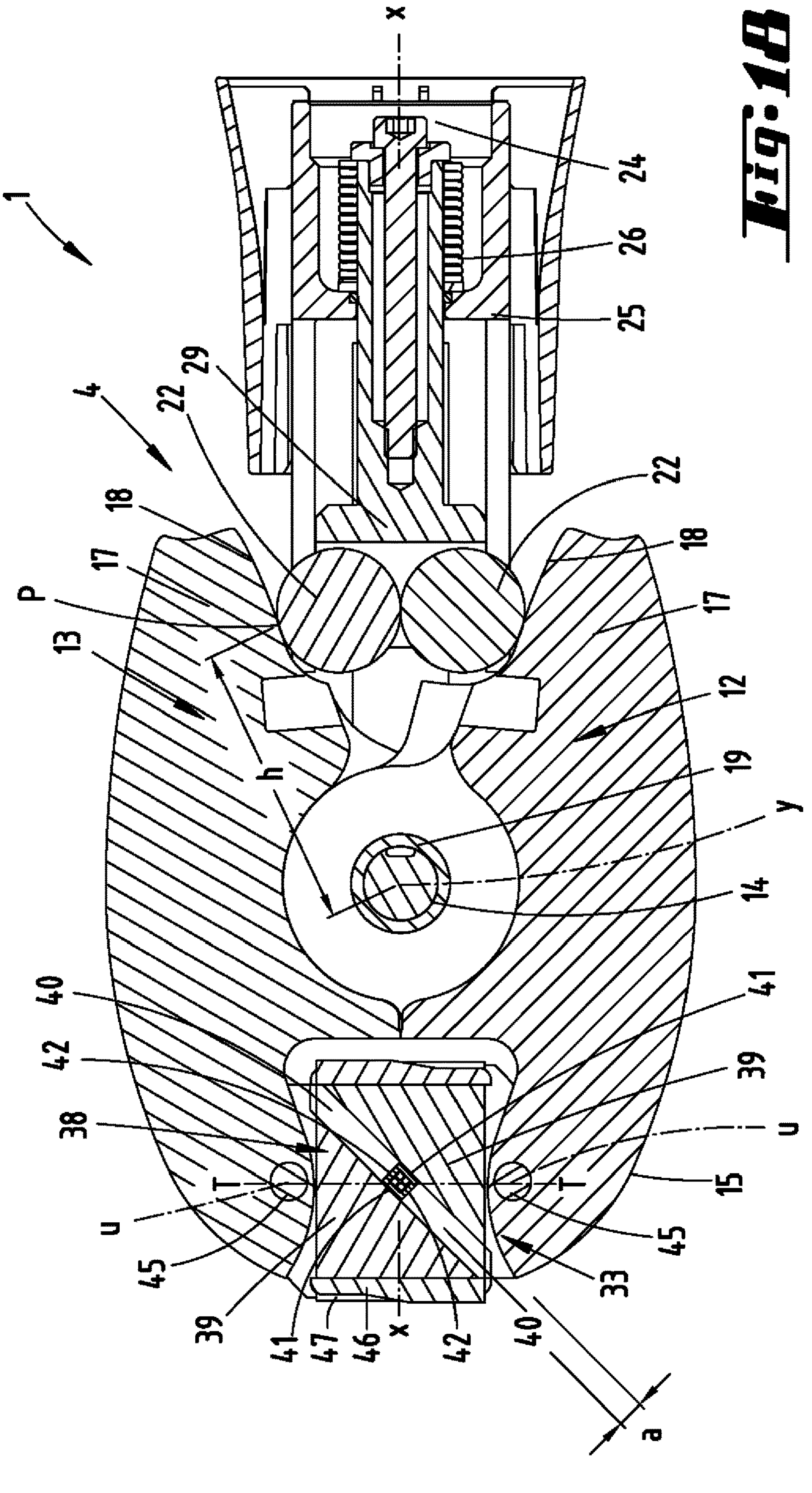
Figure 20:
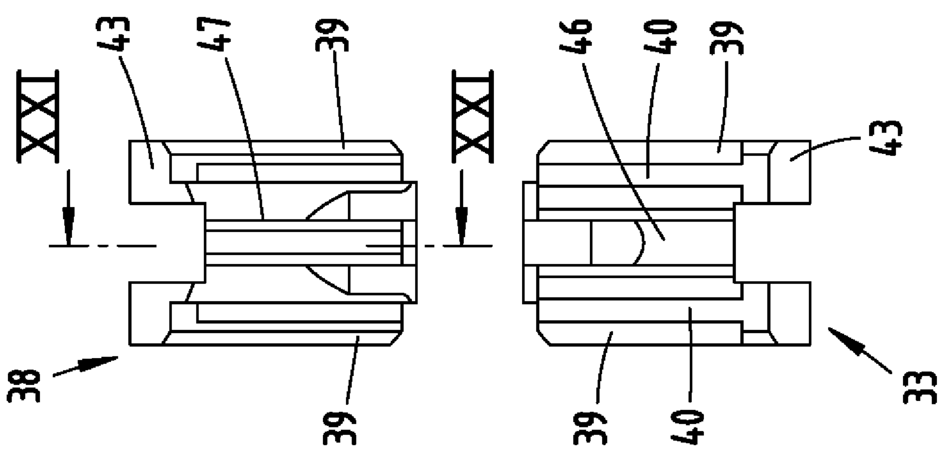
Figure 21:
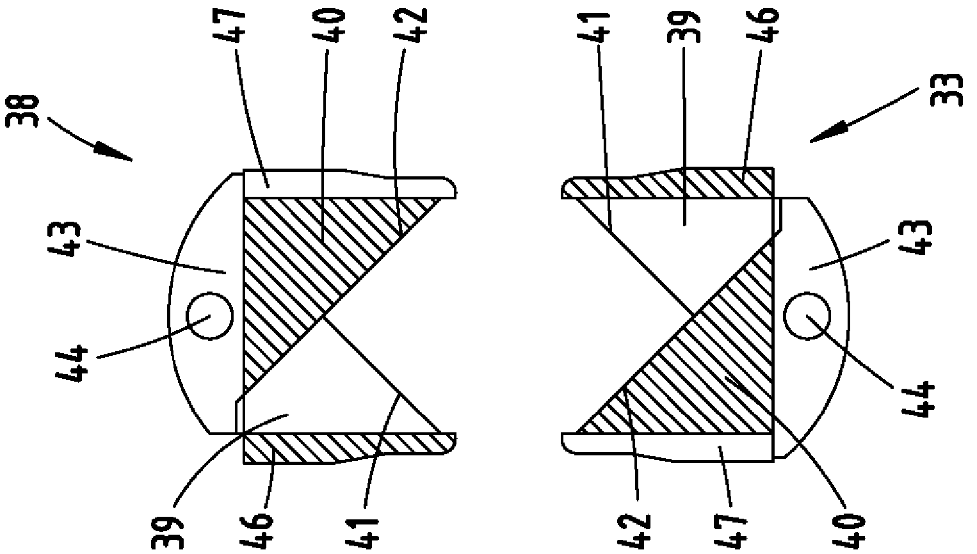
Figure 19:
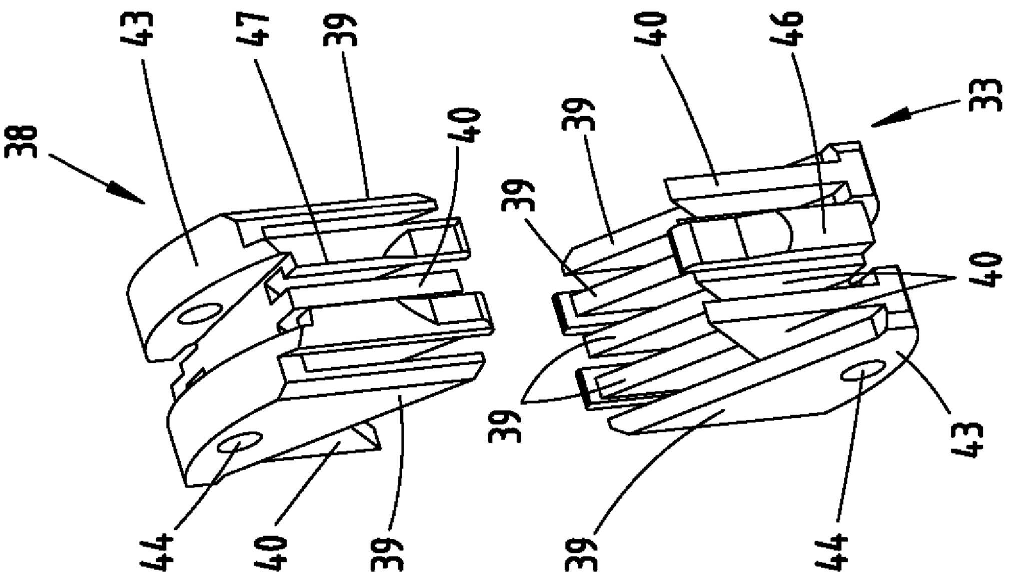

FIG. 7 a view essentially corresponding to FIG. 4, with a sleeve to be pressed that is smaller in terms of outer dimensions;

FIG. 8 is the final pressing position for the situation according to FIG. 7;

FIG. 9 is the section according to line IX-IX on FIG. 8;

FIG. 10 is a perspective, individual view of the tool part of the first embodiment;

FIG. 11 is the section according to line XI-XI on FIG. 10;

FIG. 12 is the schematic force progression for the pressing force upon reaching the maximum piston force as a function of an opening width of the pivoting jaws;

FIG. 13 is a perspective view of the working head corresponding to FIG. 2, relating to a second embodiment with two tool parts that comb into each other;

FIG. 14 is a front view of the above;

FIG. 15 is a side view of the working head of the second embodiment, relating to a basic position with a larger opening width between the pivoting jaws;

FIG. 16 is a view corresponding to FIG. 15, but in a pressing position of a sleeve with larger outer dimensions;

FIG. 17 is a view corresponding to FIG. 16, but given a sleeve with smaller outer dimensions;

FIG. 18 is a longitudinal sectional view through the working head in a situation according to FIG. 17;

FIG. 19 is a perspective, individual view of the tool parts of the second embodiment;

FIG. 20 is a front, individual view of the tool parts;

FIG. 21 is the section according to line XXI-XXI on FIG. 20 through the tool parts.

DESCRIPTION OF THE EMBODIMENTS

Figure 1:
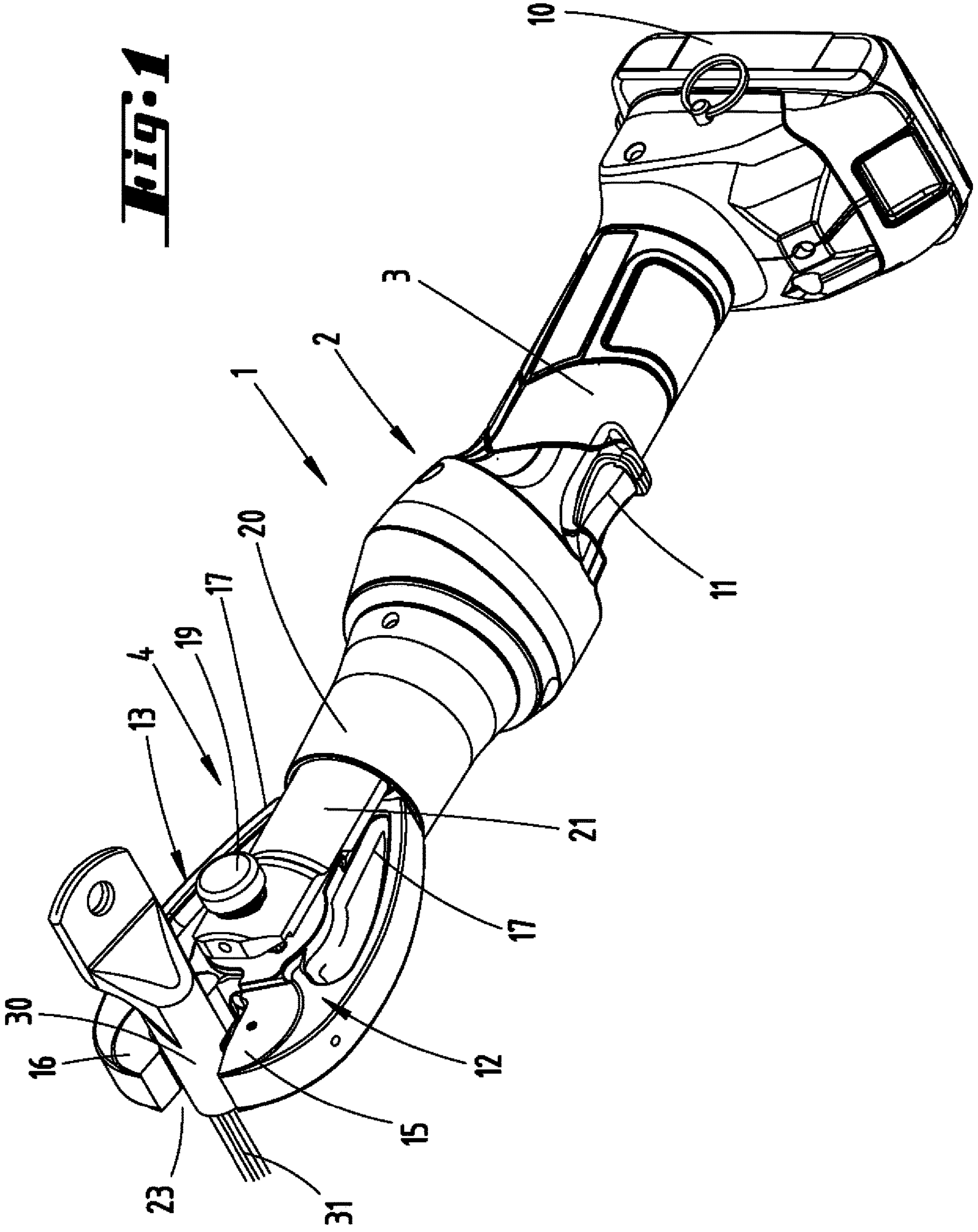
Figure 3:
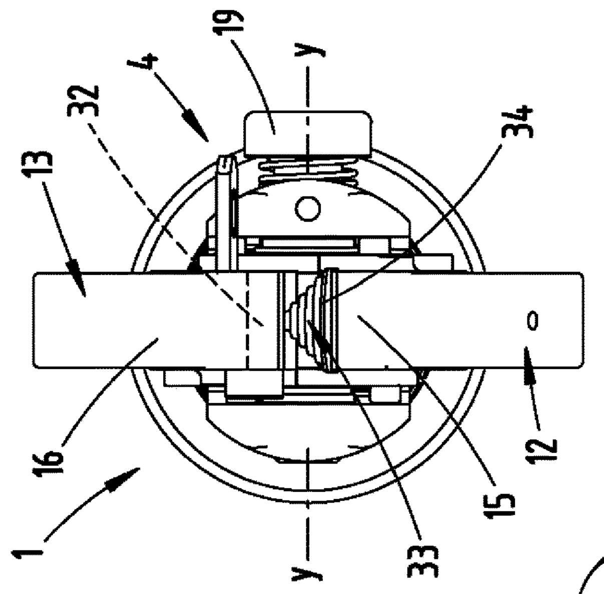
FIG. 3 is the front view against the working head.

An electrohydraulically actuatable pressing tool 1 with a rodlike design is shown and described, initially with respect to the illustration on FIG. 1.

The pressing tool 1 initially and essentially has a drive unit part 2, which can simultaneously form a handle area 3. For example, such a drive unit part 2 is known from WO 2003/084719 A2 (U.S. Pat. No. 7,254,982 B2). The content of this WO publication or US publication is hereby incorporated into the disclosure of the present invention in its entirety, also for the purpose of including features in this WO publication or US publication in claims of the present invention.

A working head 4 adjoins the drive unit part 2 toward a free end of the working tool. The latter can be replaceably mounted on the pressing tool 1, preferably by a separation in the area of a hydraulic cylinder. As also preferred, the working head 4 can further be mounted so that it can rotate freely around a working head longitudinal axis x relative to the drive unit part 2 or the related receptacle for the working head 4.

For example, visible with reference to the illustration on FIG. 4 is the correlation with the subject matter described in the mentioned WO 2003/084719 A2 (U.S. Pat. No. 7,254,982 B2) as relates to a return valve 5, a tank 6 and a pump plunger 7. Also evident in this conjunction is that a hydraulic medium pump 8 and an electric motor 9 for the hydraulic medium pump can be provided. An accumulator 10 is arranged to provide the power supply in particular to the electric motor 9, but additionally also to a control unit (not shown) and other electrical components in the pressing tool 1.

The handle area 3 is designed for conventionally handling the pressing tool housing with one hand. An activating key 11 allocated to the handle area 3 is provided in an ergonomically favorable manner.

In particular the components mentioned above—the return valve 5, tank 6, hydraulic medium pump 8 with pump plunger 7, electric motor 9, control unit and other electrical components, along with the activating key 11—are preferably all parts of the drive unit part 2.

Two pivoting jaws 12 and 13 that can pivot toward or away from each other are provided in the working head 4. The latter can be pivoted around a shared geometric pivot axis y, wherein the pivot axis y is transversely directed to the working head longitudinal axis x.

The two pivoting jaws 12 and 13 form the pressing jaw area 15 or 16 on one side of the bearing eye 14, and an action surface 18 in the form of a curved path 18 on the other side of the bearing eye 14 on a jaw leg 17.

The action surfaces 18 of both pivoting jaws 12 and 13 are arranged facing each other.

The bearing eyes 14 of both pivoting jaws 12 and 13 are aligned coaxially to each other, and in the assembly condition are penetrated by a bolt 19, for example a locking bolt. This bolt 19 is mounted on either side of the pivoting jaws 12, 13 in receiving holes of a drive head-side receiving neck 20.

The receiving neck 20 has a conventional forklike design, and has a bolt receptacle that penetrates a fork leg 21 transverse to a longitudinal extension of the receiving neck 20, preferably in the form of a through hole. The bolt 19 is held in this bolt receptacle.

The action surfaces 18 of the pivoting jaws 12 and 13 extend into the area between the fork legs 21 of the receiving neck 20, and during a pressing operation are exposed to rollers 22 of the drive unit part 2 that can preferably be displaced hydraulically in the direction toward the action surfaces 18, which causes the pivoting jaws 12, 13 to spread apart in the area of the curved path 18, and thus the pressing aw 23 formed by the pressing jaw area 15 and 16 to close.

In order to pivotably displace the pivoting jaws 12 and 13 in a pressing jaw closing direction, a hydraulic piston 24 is provided in the working head 4. The latter can be displaced along the axis x in a hydraulic cylinder 25 against the force of a restoring spring 26. The circumferential surface of each roller 22 forms an interactive surface, via which the piston 24 acts indirectly on the action surfaces 18.

During operation of the pressing tool 1, hydraulic medium is pumped into the hydraulic cylinder 25 through a hydraulic line 27 once the activating key 11 has been correspondingly activated via the pumping plunger 7, so as to correspondingly act upon the front piston surface facing the hydraulic medium.

The hydraulic piston 24 displaced opposite the force of the restoring spring 26 through exposure to a hydraulic medium linearly moves a carrier for the rollers 22 acted upon by the piston rod along the longitudinal axis x, wherein the force-transmitting interaction between the rollers 22 and curved path-like action surfaces 18 of the pivoting jaws 12 and 13 diminishes the pressing jaw 23 in the direction toward a closed position with an increasing displacement path of the rollers 22 proceeding from a basic position according to FIG. 4.

Once preferably the same respective maximum piston force has been reached, for example about 25 to 35 kN, further for example about 32 kN, the pressing operation is automatically ended, preferably by opening the return valve 5. After ending, possibly with the opening of the return valve 5, the hydraulic piston 24, and thereby the rollers 22, can be moved back into their basic position according to FIG. 4. The pivoting jaws 12 and 13 likewise pivot back into their basic position, for example by setting up a corresponding restoring spring.

The pivoting jaws 12 and 13 are designed to press or crimp parts, here represented by a sleeve 30 in the form of a cable lug with ends of an electrical conductor 31 gripped in a receiving opening 49 of the sleeve 30.

To this end, the one pivoting jaw 13 has a receptacle 32 in the pressing jaw area 16 in the form of a shell-shaped depression, wherein the part to be pressed, here the sleeve 30, is placed in this receptacle 32. The sleeve 30 can here rest completely or even just partially in this receptacle 32, depending on the respective outer dimensions, in particular depending on the starting diameter of the sleeve 30.

Figure 5:
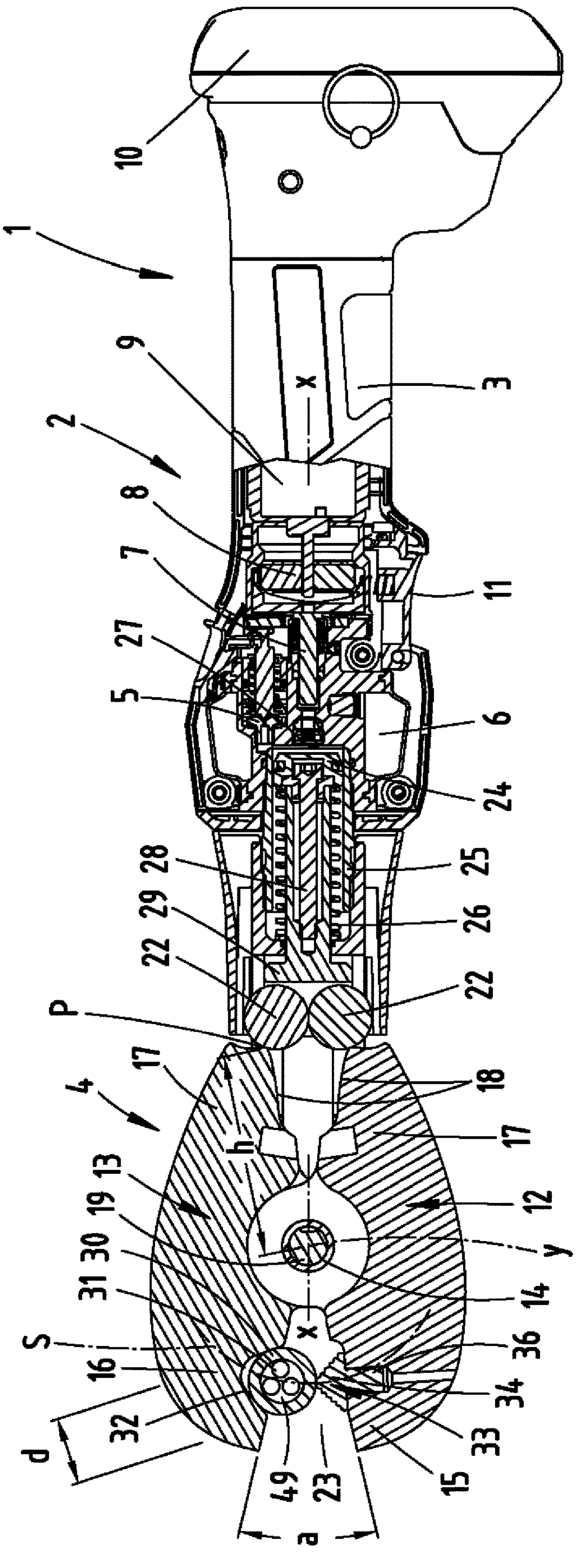
FIG. 5 is a longitudinal sectional view of the pressing tool according to FIG. 1, but relating to an intermediate position during a pressing operation, when pressing a sleeve with a larger outer dimension.
Figure 6:
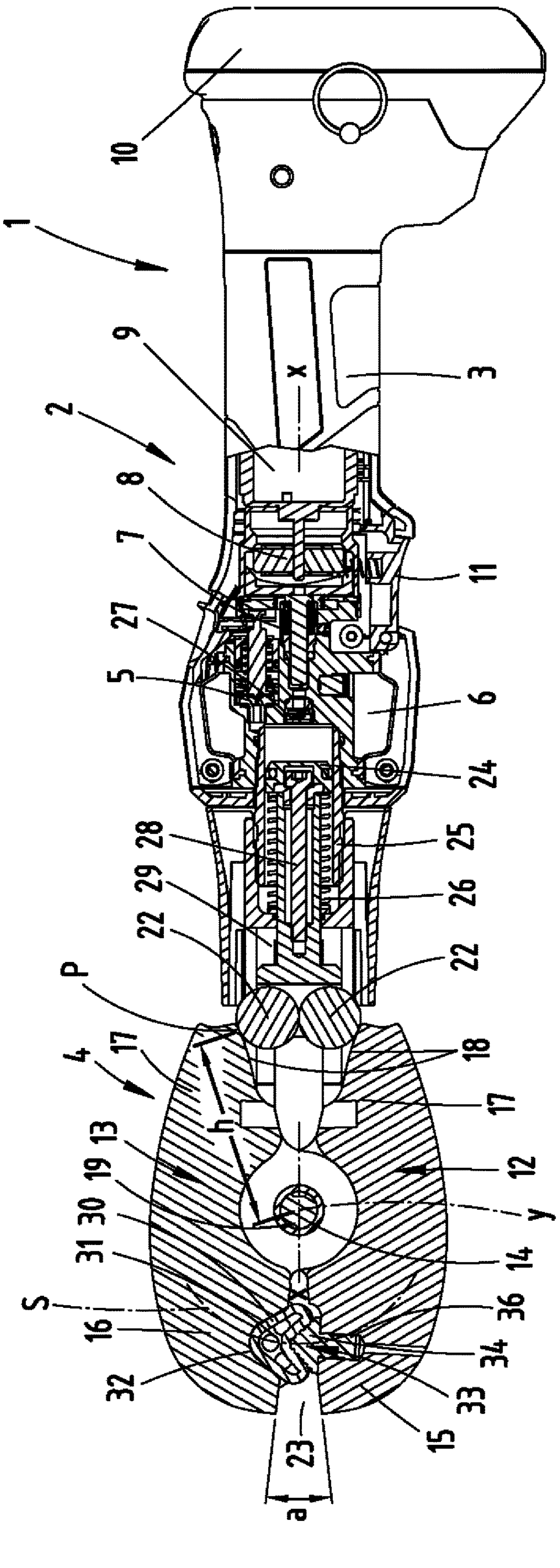
FIG. 6 is a follow-up view to FIG. 5, relating to the position at the end of the pressing operation, upon reaching a maximum piston force.

The illustrations on FIGS. 4 to 6 show a sleeve with a larger starting diameter d relative to the embodiment on FIGS. 7 to 9, which lies in the pressing jaw 23.

The receptacle 32 is arranged in such a way that its deepest point arising in a longitudinal section according to FIG. 4 lies on the pivot circle S through whose midpoint the pivot axis y runs.

Relative to the longitudinal sectional view, the tip or tip section of a tool part 33 likewise lies on the pivot circle S in the area of the other pivoting jaw 12, allocated to its pressing jaw area 15. In the first exemplary embodiment shown on FIGS. 1 to 11, the tool part 33 is designed as a pointed cone-shaped mandrel 34, whose longitudinal axis z runs essentially tangentially to the pivot circle S relative to the longitudinal sectional view.

The mandrel 34 has the pointed conical tool head 35, which relative to a plane transverse to the longitudinal axis z has a preferably round layout. Proceeding from a cone base, a peg-like bracket projection 36 extends along the longitudinal axis z. The latter is used to hold the tool part 33 in the pivoting jaw, if necessary replaceably.

The tool head 35 protrudes into the area of the pressing jaw 23, further directed in the direction toward the receptacle 32.

In the exemplary embodiment, the mandrel 34, in particular the tool head 35, is further preferably designed as a stepped mandrel in the form of a stepped cone. As evident in particular from the illustrations on FIGS. 10 and 11, this results in a stepped reduction in the tool head diameter up until the tool head tip 37 relative to a longitudinal section according to FIG. 11, proceeding from the mandrel base.

In the process of pressing the sleeve 30, the sleeve 30 is deformed via the tool part 33 and receptacle 32 by adjusting the sleeve wall to a contour that results from the tool part 33 and receptacle 32. The conductor ends gripped in the sleeve 30 are crimped with the sleeve wall.

As evident from the illustrations on FIGS. 6 and 8, pressing results in roughly L-shaped pellets with a convex surface facing the receptacle 32 and a concave surface facing the mandrel 34.

As both pivoting jaws 12, 13 pivot increasingly and—in the embodiments shown—uniformly in the direction toward a pressing jaw closing direction, a reduction takes place in the (relevant) opening width a between the pressing jaw areas 15 and 16 or along the pivot circle S between the tool tip 37 and the base of the receptacle 32.

Due to the lever arm-like force transmission between the hydraulic piston 24 and the pivoting jaws 12, 13, a high pressing force can arise in the pressing area between the tool part 33 and receptacle 32, in particular at the moment of maximum piston force.

In sleeves 30 with a larger diameter, there is usually a larger opening width a at the moment of maximum piston force than in sleeves 30 with a smaller diameter (see FIGS. 6 and 8). Correspondingly, a smaller piston displacement path along the axis x arises in larger sleeves 30 than in smaller sleeves 30 by comparison thereto. In this way, the rollers 22 interact with the curved path action surfaces 18 over different stretches. The lever arm h between the pivot axis y and the contact point P between the interactive surface of the roller 22 and action surface 18 here steadily shortens, thereby resulting in a reduction in force transmission.

As also evident from the curve progression for the pressing force F shown on FIG. 12 upon reaching the maximum piston force and as a function of the opening width a, a higher pressing force F arises upon reaching the maximum piston force at larger opening widths a than at any smaller opening width a relative to this larger opening width a, at which a smaller pressing force F in relation to the higher pressing force F always acts on the pellet.

For example, at the moment of maximum piston force, for example of about 28 to 35 kN, further for example of about 32 kN, an exemplary opening width of about 20 to 30 mm, further for example of about 25 mm, and an exemplary pressing force of about 55 to 65 kN, further for example of about 60 kN, can arise given an exemplary (circular) starting cross sectional measure for the sleeve 30 of 120 $mm^2$, while an exemplary opening width a of about 8 to 12 mm, further for example of about 10 mm, and an exemplary pressing force of about 36 to 40 kN, further for example of about 38 kN, can arise at 50 $mm^2$, for example, and an exemplary opening width a of about 3 to 4 mm, further for example of about 3.5 mm, and an accompanying exemplary pressing force F of about 38 to 35 kN, further for example of about 32 kN, can arise at 10 $mm^2$, for example.

The interaction described above between the opening widths a and pressing force F also arises in the second exemplary embodiment shown on FIGS. 13 to 21.

In terms of the drive and the basic arrangement and design of the pivoting jaws 12, 13 in particular in the area of their action surfaces 18, the respective pressing tool 1 is initially and basically identical to those in the first embodiment. As opposed to this first embodiment, a tool part 33 and 38 is here allocated to each pivoting jaw 12 and 13. While the pivoting jaws 12 and 13 pivot toward each other, the latter interact to press parts, for example a sleeve 30 and a conductor 31.

The tool parts 33 and 38 are essentially identical in shape, and here preferably each held in the pressing jaw area 15 or 16 so as to be pivotable around an axis u. This axis u extends codirectionally to the pivoting axis y of the pivoting jaws 12 and 13.

Each of the tool parts 33 and 38 of the second embodiment have a plurality of individually arranged first and second ribs 39, 40, which are provided in the direction of the pivot axis y or in the direction of the tool part-side pivot axis u, arranged one behind the other.

The first and second ribs 39 and 40 of a tool part 33 or 38 are alternately arranged, wherein the latter can in this alternate arrangement abut directly against the ribs adjacent in an axial direction on one or both sides.

As evident in detail from the illustration on FIGS. 19 to 21, a respective triangular shape for the ribs 39 and 40 arises with regard to a plane transversely directed to the pivot axis u. As evident in particular from the sectional view on FIG. 21, the layout design for a rib 39, 40 can take the form of an equilateral triangle, wherein the hypotenuse of a first rib 39 of this triangle can comprise a first peripheral edge 41 that runs at an acute angle to the pivot circle S or at an angle of about 45 degrees to a tangent T on the pivot circle S.

The respective second peripheral edge 42 of the second rib 40 is directed opposite the first peripheral edge 41 in relation to a layout or a sectional view according to FIG. 21, and correspondingly runs in a projection along the axis u, at least at an angle of 90 degrees to the first peripheral edge 41.

The first and second ribs 39 and 40 are fastened to a common base 43, wherein this base 43 incorporates a receiving hole 44 running in the axial direction for a trunnion 45 gripped on the jaw side.

Viewed in the direction of movement of the tool parts 38 and 33, a guiding projection 46 can be provided to the side of each tool part 33, 38, which moves into a correspondingly adjusted guiding receptacle 47 of the other tool part 38, 33, thereby ensuring that the two tool parts 33 and 38 are reliably guided relative to each other during a pressing operation.

The first and second ribs 39 and 40 of both tool parts 33 and 38 comb into each other, such that, in one possible embodiment, a press opening 48 with essentially a rectangular appearance arises in the direction of the axis u or the pivot axis y, both in a completely open basic position as shown on FIG. 15 and in each closed pressing position as shown on FIGS. 16 and 17. The latter is circumferentially bordered by the first and second peripheral edges 41 and 42 of the first and second ribs 39 and 40 of the tool parts 33 and 38.

Given the ability of the tool parts 33 and 38 to pivot via the axis u, pivoting the pressing jaw areas 15, 16 of the pivoting jaws 12, 13 so that they move toward each other also causes the tool parts 33 and 38 or their first and second ribs 39 and 40 to linearly mesh into each other.

In this embodiment of the tool parts 33 and 38 as well, and in particular due to the given transmission between the hydraulic piston 24—via the rollers 22—and the action surfaces 18 of the pivoting jaws 12, 13, a higher pressing force F acting on the pellet or sleeve 30 is on hand given a larger opening width a once the respective maximum piston force has been reached, owing to the pressing of a pellet, for example a sleeve 30, with larger outer dimensions (see FIG. 16), whereas a lower pressing force F by comparison to the higher pressing force F described above is active once the maximum piston force has been reached if any opening width a is smaller than this opening width a, for example as shown on FIG. 17, because a pellet or sleeve 30 has smaller outer dimensions.

The above statements serve to explain the inventions encompassed by the application overall, which further develop the prior art at least via the following feature combinations and also each taken separately, wherein two, several or all of these feature combinations can also be combined, specifically:

A pressing tool, characterized in that the action surface 18 is designed in such a way that a higher pressing force F is active as allocated to a larger opening width a of the pivoting jaw 12, 13 once the maximum piston force has been reached, and that a smaller pressing force F by comparison to the higher pressing force F is active as allocated to each smaller opening width a of the pivoting jaw 12, 13 by comparison to the larger opening width once the maximum piston force has been reached.

A pressing tool, characterized in that the tool part 33 is designed as a mandrel 34 directed tangentially relative to a pivot circle S, through whose midpoint the pivot axis y runs.

A pressing tool, characterized in that the mandrel 34 is designed as a stepped mandrel.

A pressing tool, characterized in that two pivoting jaws 12, 13 are provided.

A pressing tool, characterized in that a receptacle 32 is formed on a pivoting jaw 13.

A pressing tool, characterized in that each pivoting jaw 12, 13 has a tool part 33, 38.

A pressing tool, characterized in that each of the tool parts 33, 38 has a plurality of ribs 39, 40 arranged one after the other in the direction of the pivot axis y, and the ribs 39, 40 of the tool parts 33, 38 mesh into each other during a pressing operation.

A pressing tool, characterized in that the ribs 39, 40 of a tool part 33, 38 are divided into first 41 and second 42 ribs, which are staggered relative to each other in the direction of the pivot axis y.

A pressing tool, characterized in that, in relation to a press opening 48 that remains between the tool parts 33, 38 and has an essentially rectangular appearance in the direction of the pivot axis y, the first ribs 39 form a first, essentially straight peripheral edge 41 of the press opening 48, and the second ribs 40 form a second peripheral edge 42 running essentially perpendicular to the first peripheral edge 41.

A pressing tool, characterized in that the tool part 33, 38 is movably arranged on the pivoting jaw 12, 13.

A pressing tool, characterized in that the tool part 33, 38 is pivotably arranged on the pivoting jaw 12, 13.

All disclosed features are (whether taken separately or in combination) essential to the invention. The disclosure of the application hereby also includes the disclosure content of the accompanying/attached priority documents (copy of prior application) in its entirety, including for the purpose of incorporating features from these documents into claims of the present application. Even without the features of a reference claim, the subclaims with their features characterize separate inventive further developments of prior art, in particular in order to initiate partial applications based upon these claims. The invention indicated in each claim can additionally have one or several of the features indicated in the above specification, in particular those provided with reference numbers, and/or on the reference list. The invention also relates to embodiments in which some of the features mentioned in the above specification are not realized, in particular to the extent that they are clearly not required for the respectively intended application or can be replaced by other technically equivalent means.

REFERENCE LIST

| | |
|---|---|
| 1 | Pressing tool |
| 2 | Drive unit part |
| 3 | Handle area |
| 4 | Working head |
| 5 | Return valve |
| 6 | Tank |
| 7 | Pump plunger |
| 8 | Hydraulic medium pump |

-continued

| | |
|---|---|
| 9 | Electric motor |
| 10 | Accumulator |
| 11 | Activating key |
| 12 | Pivoting jaw |
| 13 | Pivoting jaw |
| 14 | Bearing eye |
| 15 | Pressing jaw area |
| 16 | Pressing jaw area |
| 17 | Jaw leg |
| 18 | Action surface |
| 19 | Bolt |
| 20 | Receiving neck |
| 21 | Fork leg |
| 22 | Roller |
| 23 | Pressing jaw |
| 24 | Hydraulic piston |
| 25 | Hydraulic cylinder |
| 26 | Restoring spring |
| 27 | Hydraulic line |
| 28 | Piston rod |
| y | Pivot axis |
| z | Longitudinal axis |
| F | Pressing force |
| P | Contact point |
| S | Pivot circle |
| T | Tangent |
| 29 | Carrier |
| 30 | Sleeve |
| 31 | Conductor |
| 32 | Receptacle |
| 33 | Tool part |
| 34 | Mandrel |
| 35 | Tool head |
| 36 | Bracket projection |
| 37 | Tool head tip |
| 38 | Tool part |
| 39 | First rib |
| 40 | Second rib |
| 41 | First peripheral edge |
| 42 | Second peripheral edge |
| 43 | Base |
| 44 | Receiving hole |
| 45 | Trunnion |
| 46 | Guiding projection |
| 47 | Guiding receptacle |
| 48 | Press opening |
| 49 | Receiving opening |
| a | Opening width |
| d | Starting diameter |
| h | Lever arm |
| u | Axis |
| x | Longitudinal axis |

The invention claimed is:

1. A pressing tool for performing a pressing operation for the press-fitting of parts, wherein one part can have different outer dimensions within a specified range, the pressing tool comprising:

a tool part for acting on the part, the tool part is part of a pivoting jaw having an action surface, the pivoting jaw being pivotable around a pivot axis from a starting position having a greatest opening width into a pressing position having a smaller opening width;

a hydraulic cylinder; and a hydraulic piston movable in the hydraulic cylinder, which applies a piston force depending on a hydraulic pressure in the hydraulic cylinder, wherein each time the hydraulic piston is moved, the pressing operation automatically ends once a same maximum piston force has been reached, the hydraulic piston having a roller forming an interactive surface connected with the hydraulic piston for a force-transmitting interaction of the hydraulic piston with the action surface, wherein the piston force can be converted into a deviating pressing force due to a geometry of the action surface, wherein the action surface provides a higher pressing force to a larger opening width of the pivoting jaw once a maximum piston force has been reached, and the action surface provides a smaller pressing force in comparison to the higher pressing force to each smaller opening width of the pivoting jaw in comparison to the larger opening width once the maximum piston force has been reached.

2. The pressing tool according to claim 1, wherein the tool part is a mandrel directed tangentially relative to a pivot circle, through whose midpoint the pivot axis runs.

3. The pressing tool according to claim 2, wherein the mandrel is a stepped mandrel.

4. The pressing tool according to claim 3, wherein two pivoting jaws are provided.

5. The pressing tool according to claim 1, wherein a receptacle is formed on the pivoting jaw.

6. The pressing tool according to claim 5, wherein two pivoting jaws are provided, and each pivoting jaw has a tool part.

7. The pressing tool according to claim 6, wherein each tool part has a plurality of ribs arranged one after the other in a direction of the pivot axis, and the ribs of the tool parts mesh into each other during a pressing operation.

8. The pressing tool according to claim 7, wherein the ribs of at least one of the tools parts are provided by first ribs and second ribs, which are staggered relative to each other in the direction of the pivot axis.

9. The pressing tool according to claim 8, wherein, in relation to a press opening between the tool parts which is generally rectangular in the direction of the pivot axis, the first ribs form a first, generally straight peripheral edge of the press opening, and the second ribs form a second peripheral edge running generally perpendicular to the first peripheral edge.

10. The pressing tool according to claim 1, wherein the tool part is movably arranged on the pivoting jaw.

11. The pressing tool according to claim 10, wherein the tool part is pivotably arranged on the pivoting jaw.

12. The pressing tool according to claim 1, wherein two pivoting jaws are provided.

13. The pressing tool according to claim 12, wherein each pivoting jaw has a tool part movably arranged thereon.

14. The pressing tool according to claim 13, wherein the tool part is pivotably arranged on each pivoting jaw.

15. The pressing tool according to claim 2, wherein two pivoting jaws are provided.

16. A pressing tool for performing a pressing operation for the press-fitting of parts, wherein one part can have different outer dimensions within a specified range, the pressing tool comprising:

first and second pivoting jaws, each jaw having an action surface, the jaws being pivotable around a pivot axis from a starting position having a greatest opening width into a pressing position having a smaller opening width;

a tool part on each pivoting jaw and provided for acting on the part, the tool part is part of a hydraulic cylinder;

a hydraulic piston movable in the hydraulic cylinder, which applies a piston force depending on a hydraulic pressure in the hydraulic cylinder, wherein each time the hydraulic piston is moved, the pressing operation automatically ends once a same maximum piston force has been reached, the hydraulic piston having a roller forming an interactive surface connected with the hydraulic piston for a force-transmitting interaction of the hydraulic piston with the action surface, wherein the piston force can be converted into a deviating pressing force due to a geometry of the action surface, wherein the action surface provides a higher pressing force to a larger opening width of the pivoting jaw once a maximum piston force has been reached, and the action surface provides a smaller pressing force in comparison to the higher pressing force to each smaller opening width of the pivoting jaw in comparison to the larger opening width once the maximum piston force has been reached, wherein the tool part is a mandrel directed tangentially relative to a pivot circle, through whose midpoint the pivot axis runs; and a receptacle provided on each pivoting jaw, wherein each of the tool parts has a plurality of ribs arranged one after the other in a direction of the pivot axis, and the ribs of the tool parts mesh into each other during a pressing operation.

17. The pressing tool according to claim 16, wherein each tool part is movably arranged on the pivoting jaw.

18. The pressing tool according to claim 17, wherein the tool part is pivotably arranged on the pivoting jaw.

19. The pressing tool according to claim 16, wherein the ribs of one of the tool parts are divided into first ribs and second ribs which are staggered relative to each other in the direction of the pivot axis.

20. The pressing tool according to claim 19, wherein in relation to a press opening that remains between the tool parts and has an essentially rectangular appearance in the direction of the pivot axis, the first ribs form a first, essentially straight peripheral edge of the press opening, and the second ribs form a second peripheral edge running essentially perpendicular to the first peripheral edge.

* * * * *